United States Patent
Kim (10) Patent No.: US 10,788,048 B2
(45) Date of Patent: Sep. 29, 2020

(54) INLET GUIDE VANE ASSEMBLY

(71) Applicant: HANWHA AEROSPACE CO.,LTD., Changwon-si (KR)

(72) Inventor: Jin Hyoung Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 132 days.

(21) Appl. No.: 15/938,818

(22) Filed: Mar. 28, 2018

(65) Prior Publication Data
US 2019/0063459 A1    Feb. 28, 2019

(30) Foreign Application Priority Data

Aug. 23, 2017  (KR) .................. 10-2017-0106638

(51) Int. Cl.
| | |
|---|---|
| *F04D 29/46* | (2006.01) |
| *F04D 29/24* | (2006.01) |
| *F04D 29/56* | (2006.01) |
| *F02C 3/13* | (2006.01) |
| *F02C 7/057* | (2006.01) |
| *F01D 17/16* | (2006.01) |

(52) U.S. Cl.
CPC .......... *F04D 29/46* (2013.01); *F01D 17/165* (2013.01); *F02C 3/13* (2013.01); *F02C 7/057* (2013.01); *F04D 29/242* (2013.01); *F04D 29/56* (2013.01); *F05B 2260/96* (2013.01); *F05D 2250/51* (2013.01); *F05D 2250/611* (2013.01); *F05D 2260/38* (2013.01); *F05D 2260/53* (2013.01); *F05D 2260/96* (2013.01)

(58) Field of Classification Search
CPC ...... F01D 17/165; F01D 17/162; F01D 17/16; F01D 25/04; F01D 25/06; F04D 29/46; F04D 29/56; F05B 2260/96; F05D 2260/96; F05D 2260/38; F05D 2260/53; F05D 2250/611
See application file for complete search history.

(56) References Cited

U.S. PATENT DOCUMENTS

| | | | | |
|---|---|---|---|---|
| 2,424,839 | A * | 7/1947 | Morton | ..................... F01P 7/02 123/41.06 |
| 8,038,387 | B2 * | 10/2011 | Houradou | ............. F01D 17/162 384/215 |
| 8,245,530 | B2 | 8/2012 | Sugitani | |
| 9,632,010 | B2 | 4/2017 | Ding et al. | |

FOREIGN PATENT DOCUMENTS

| | | |
|---|---|---|
| JP | 5109696 B2 | 12/2012 |
| KR | 1020100100240 A | 9/2010 |
| KR | 1020150012217 A | 2/2015 |

* cited by examiner

*Primary Examiner* — David E Sosnowski
*Assistant Examiner* — Danielle M. Christensen
(74) *Attorney, Agent, or Firm* — Sughrue Mion, PLLC (57) ABSTRACT

An inlet guide vane assembly is provided. The inlet guide vane assembly includes a housing, a rotating shaft rotatably located in the housing, a vane portion connected to the rotating shaft, a bushing portion located between the rotating shaft and the housing, and an elastic portion located between the bushing portion and the rotating shaft.

8 Claims, 5 Drawing Sheets

INLET GUIDE VANE ASSEMBLY

CROSS-REFERENCE TO THE RELATED APPLICATION

This application claims priority from Korean Patent Application No. 10-2017-0106638, filed on Aug. 23, 2017 in the Korean Intellectual Property Office, the disclosure of which is incorporated herein in its entirety by reference.

BACKGROUND

1. Field

One or more example embodiments relate to a device, and more particularly, to an inlet guide vane assembly.

2. Description of the Related Art

An inlet guide vane assembly may be provided in a fluid machine such as a compressor or a turbine. The performance of the fluid machine may be adjusted by the inlet guide vane assembly controlling the amount of a fluid introduced into the fluid machine.

Such an inlet guide vane assembly may include a rotating shaft provided in a housing and a gear unit connected to the rotating shaft. In this case, the rotating shaft may rotate as the gear unit operates, and the rotating shaft may be rotatably connected to the housing. Also, the gear unit may include a plurality of gears that are separated from one another. In this case, the plurality of gears may be engaged and interlocked with one another, and the rotating shaft may rotate based on the interlocked gears rotating.

When the gears are interlocked with one another, the gears may have a tolerance according to the performance of the gears, the characteristics of the gears, etc. In particular, there may be a slight gap between teeth of each of the gears. When one gear rotates to rotate another interlocked gear, a rotational force may not be directly transmitted to the other gear. In this case, when teeth of the gear and teeth of the other gear contact each other and rotate, the rotating shaft may be distorted and a position of the rotating shaft may be altered due to the contact between the teeth of the gears. In particular, since both ends of the rotating shaft rotate in opposite directions in a longitudinal direction of the rotating shaft, the both ends of the rotating shaft may contact different portions of the housing. In this case, vibration or noise may occur in the inlet guide vane assembly according to the movement of the rotating shaft. Also, when greater external force is applied to the rotating shaft or the rotating shaft repeatedly applies a force to the housing according to the movement of the rotating shaft, at least one of the rotating shaft and the housing may be damaged.

SUMMARY

One or more example embodiments provide an inlet guide vane assembly.

According to an aspect of an example embodiment, there is provided an inlet guide vane assembly including a housing, a rotating shaft disposed in the housing, a vane portion connected to the rotating shaft, a bushing portion disposed between the rotating shaft and the housing, and an elastic portion disposed between the bushing portion and the rotating shaft.

The inlet guide vane assembly, wherein at least a part of the elastic portion may be curved.

The inlet guide vane assembly, wherein an insertion groove into which the elastic portion is inserted may be formed on an outer surface of the rotating shaft.

The elastic portion and the rotating shaft may be in point contact with each other.

The elastic portion may include a plurality of recess portions and a plurality of protruded portions.

The inlet guide vane assembly may further include a first gear disposed on the rotating shaft and configured to rotate the rotating shaft, and a second gear connected to the first gear and configured to rotate the first gear.

According to another aspect of an example embodiment, there is provided an inlet guide vane assembly including a housing, a rotating shaft disposed in the housing, a vane portion connected to the rotating shaft, a bushing portion disposed between the rotating shaft and the housing, and an elastic portion disposed between the bushing portion and the rotating shaft, wherein the elastic portion includes a body portion, and a protruding portion protruding from the body portion.

The protruding portion may protrude from an inner surface of the body portion toward the rotating shaft.

The body portion may be formed in an annular shape, and the protruding portion may include a plurality of protruding portions space apart from each other.

The protruding portion and the rotating shaft may be in line contact with each other.

The inlet guide vane assembly, wherein a surface of the protruding portion contacting the rotating shaft may be curved.

The inlet guide vane assembly, wherein an insertion groove into which the elastic portion is inserted may be formed on an outer surface of the rotating shaft.

The inlet guide vane assembly, where a portion of the insertion groove corresponding to the protruding portion and the body portion, and a portion of the insertion groove corresponding to only the body portion may have different depths.

According to another aspect of an example embodiment, there is provided an inlet guide vane assembly including a housing, a rotating shaft disposed in the housing, a vane portion connected to the rotating shaft, a bushing portion disposed between the rotating shaft and the housing, and an elastic portion disposed between the bushing portion and the rotating shaft, wherein the elastic portion includes a first case, and a second case coupled to the first case and configured to move corresponding to the first case.

The elastic portion may further include a damping fluid between the first case and the second case.

The elastic portion may further include a sealing member disposed between the first case and the second case.

The inlet guide vane assembly, wherein an insertion groove into which the elastic portion is inserted may be formed on an outer surface of the rotating shaft.

The inlet guide vane assembly may further include a first gear disposed on the rotating shaft and configured to rotate the rotating shaft, and a second gear connected to the first gear and configured to rotate the first gear.

BRIEF DESCRIPTION OF THE DRAWINGS

The above and other aspects, features, and advantages of certain embodiments of the present disclosure will become apparent and more readily appreciated from the following description of the example embodiments, taken in conjunction with the accompanying drawings in which.

DETAILED DESCRIPTION

The present disclosure will be described more fully with reference to the accompanying drawings, in which example embodiments are shown. The present disclosure may, however, be embodied in many different forms and should not be construed as being limited to the example embodiments set forth herein; rather these example embodiments are provided so that this disclosure will be thorough and complete, and will fully convey the concept of the present disclosure to one of ordinary skill in the art.

The terminology used herein is for the purpose of describing example embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising" used herein specify the presence of stated components, steps, operations, and/or elements, but do not preclude the presence or addition of one or more other components, steps, operations, and/or elements. It will be understood that, although the terms first, second, etc. may be used herein to describe various components, these components should not be limited by these terms. These terms are only used to distinguish one component from another.

Expressions such as "at least one of", when preceding a list of components, modify the entire list of components and do not modify the individual components of the list. For example, the expression, "at least one of a, b, and c," should be understood as including only a, only b, only c, both a and b, both a and c, both b and c, or all of a, b, and c.

Figure 1:
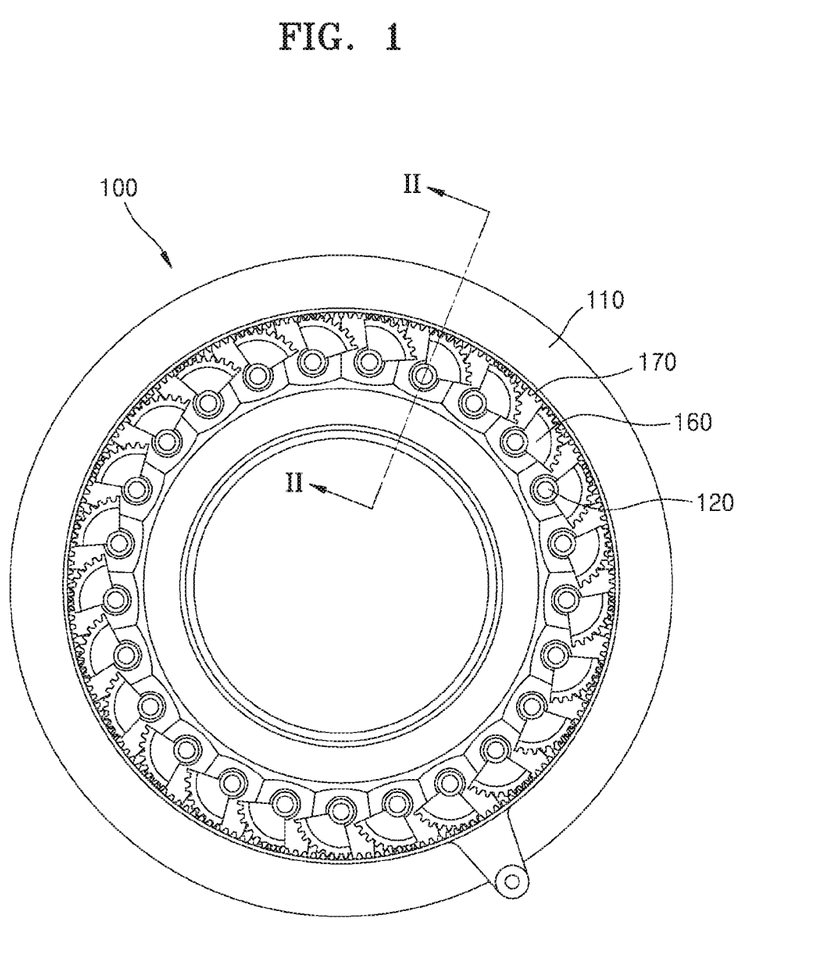
FIG. 1 is a perspective view illustrating a part of an inlet guide vane assembly according to an example embodiment.
Figure 2:
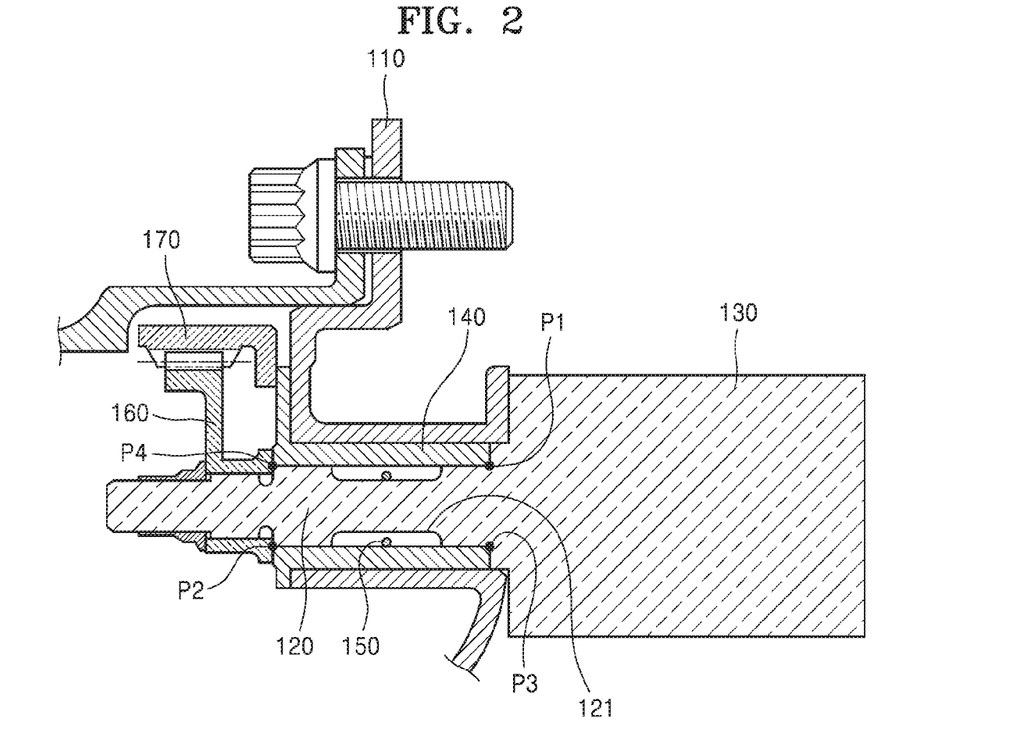
FIG. 2 is a cross-sectional view taken along a line II-II of FIG. 1.
Figure 3:
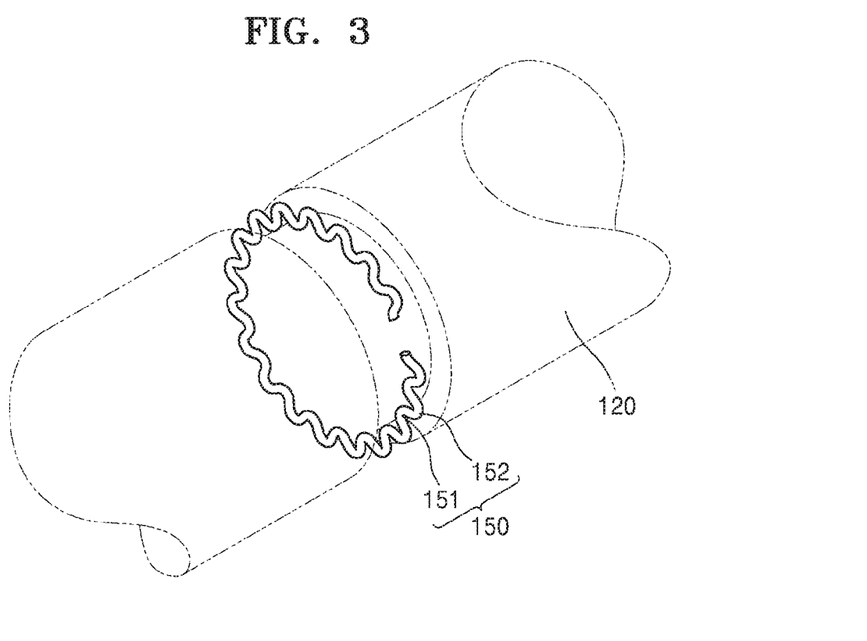
FIG. 3 is a perspective view illustrating an elastic portion of FIG. 2.

FIG. 1 is a perspective view illustrating a part of an inlet guide vane assembly 100 according to an example embodiment. FIG. 2 is a cross-sectional view taken along a line II-II of FIG. 1. FIG. 3 is a perspective view illustrating an elastic portion 150 of FIG. 2.

Referring to FIGS. 1 and 2, the inlet guide vane assembly 100 may include a housing 110, a rotating shaft 120, a vane portion 130, a bushing portion 140, the elastic portion 150, a first gear 160, and a second gear 170.

An inner space may be formed in the housing 110 and may extend from an upper entrance to a lower exit of the housing 110. In this case, the housing 110 may be connected to a fluid machine such as a compressor, a turbine, or an engine, and may be configured to guide fluid to the fluid machine. In example embodiment, an impeller may be located in the housing 110. For convenience of explanation, the following will be described according to an example embodiment including the impeller being located in the housing 110.

The rotating shaft 120 may be rotatably provided in the housing 110. For example, in an example embodiment, the rotating shaft 120 may be provided in the housing 110 to pass through the center of the housing 110 from an outer surface to an inner surface of the housing 110. A plurality of the rotating shafts 120 may also be provided along the outer surface of the housing 110 to be spaced apart from one another. In this case, the housing 110 may be formed to have a circular cylindrical shape, and the plurality of rotating shafts 120 may be inserted into the housing 110 toward the center of the housing 110. In an example embodiment, the plurality of rotating shafts 120 may be inserted into the housing 110 in an axial thickness direction of the housing 110. For convenience of explanation, the following will be described in detail according to an example embodiment including the plurality of rotating shafts 120 being inserted in the thickness direction of the housing 110.

The vane portion 130 may be connected to the rotating shaft 120. In this case, the vane portion 130 may be located inside of the housing 110. A plurality of the vane portions 130 may be provided, and may be respectively connected to the plurality of rotating shafts 120. In this case, the plurality of vane portions 130 may completely cover and close the inside of the housing 110, and may open the inner space of the housing 110 as the plurality of rotating shafts 120 rotate. The vane portions 130 may be formed to each have an airfoil shape. In an example embodiment, the vane portions 130 may be located in the thickness direction of the housing 110 and may protrude from the housing 110. In this case, the vane portions 130 may adjust the amount of a fluid moving toward the impeller or may control the amount of a fluid ejected from the impeller as the impeller rotates. For convenience of explanation, the following will be described according to an example embodiment including the vane portions 130 being located in the thickness direction of the housing 110.

The bushing portion 140 may be located between the rotating shaft 120 and the housing 110. In this case, a part of the bushing portion 140 may be bent and, one bent part of the bushing portion 140 may be inserted inside of the housing 110, and another bent part of the bushing portion 140 may be located inside of the housing 110.

The elastic portion 150 may be located between the bushing portion 140 and the rotating shaft 120. In this case, the elastic portion 150 may be provided to be in point contact with the rotating shaft 120. For example, the elastic portion 150 may be formed to be curved. For example, as illustrated in FIG. 3, the elastic portion 150 may include a recess portion 151 that is recessed toward the center of the rotating shaft 120, and a protruding portion 152 that is connected to the recess portions 151 and more protruded toward the rotating shaft 120 compared to the recess portion 151. According to an example embodiment, a plurality of the recess portions 151 and the protruding portions 152 may be provided. Each of the recess portions 151 and each of protruding portions 152 may be alternately connected. For example, one protruding portion 152 may be located between adjacent recess portions 151, and one recess portion 151 may be located between adjacent protruding portions 152. In particular, the recess portions 151 and the protruding portions 152 may each have a curved shape.

The elastic portion 150 may be formed to have, for example, an annular shape or the like. In this case, the elastic portion 150 may have a ring shape or may be partially opened. When the elastic portion 150 is partially opened, the elastic portion 150 may be manufactured by forming a linear member into an annular uneven member including the plurality of recess portions 151 and the plurality of protruding portions 152.

According to an example embodiment, the elastic portion 150 may be formed of an elastic material. For example, the elastic portion 150 may include a metal material such as iron or copper. However, example embodiments are not limited thereto, and the elastic portion 150 may include a non-metallic material such as silicon, rubber, synthetic resin, or urethane, etc.

The first gear 160 may be connected to the rotating shaft 120 and may be configured to rotate the rotating shaft 120. For example, the first gear 160 may be a spur gear or a helical gear.

The second gear 170 may be rotatably provided on the housing 110 and may be connected to the first gear 160. For example, the second gear 170 may rotate along an outer circumferential surface of the housing 110 according to an external input. The second gear 170 may be a ring gear, and teeth may be formed on an outer surface or an inner surface of the second gear 170 so that the second gear 170 and the first gear 160 are engaged and interlocked with each other. For convenience of explanation, the following will be described according to an example embodiment including the teeth being formed on the inner surface of the second gear 170.

An operation of the inlet guide vane assembly 100 will now be described. According to an example embodiment, an external operating force may be input to rotate the second gear 170. For example, a device for generating the operating force may be a motor and a gear connected to the second gear 170. However, example embodiments are not limited thereto, and the device may be a cylinder connected to the second gear 1701. For convenience of explanation, the following will be described according to an example embodiment including the operating force for rotating the second gear 170 being generated by the cylinder.

When the second gear 170 rotates, the first gear 160 may rotate. In this case, a rotation direction of the second gear 170 may vary according to the external operating force. Also, a rotation direction of the first gear 160 may vary according to the rotation direction of the second gear 170.

When the first gear 160 rotates, the rotating shaft 120 connected to the first gear 160 may rotate. As illustrated in FIG. 3, according to contact between the first gear 160 and the second gear 170, both ends of the rotating shaft 120 may respectively contact a first point P1 and a second point P2, or may respectively contact a third point P3 and a fourth point P4. In this case, when the both ends of the rotating shaft 120 contact the first point P1 and the second point P2, or the third point P3 and the fourth point P4, a moment or shear stress may be generated in the rotating shaft 120. Also, a force may be applied by the rotating shaft 120 to the bushing portion 120, and a force may be applied to a portion of the housing 110 that is the same as or similar to that of the bushing portion 140. In this case, noise or vibration may occur in at least one of the housing 110, the bushing portion 140, and the rotating shaft 120. When an excessive force above a predetermined level is applied, at least one of the housing 110, the bushing portion 140, and the rotating shaft 120 may be damaged.

According to an example embodiment, the elastic portion 150 may reduce or prevent the rotating shaft 120 from applying an excessive force to the first point P1 and the second point P2, or the third point P3 and the fourth point P4. In detail, when the rotating shaft 120 is about to move, the rotating shaft 120 may apply a force to the elastic portion 150. In this case, a shape of the elastic portion 150 may be altered, and the elastic portion 150 may generate an elastic force or a restoring force. The elastic portion 150 may apply a force to the rotating shaft 120 so that the rotating shaft 120 is separated from the bushing portion 140 at a central portion of the rotating shaft 120 in a longitudinal direction. In this case, the rotating shaft 120 may not rotate with the same force as in the above due to the elastic force of the elastic portion 150, and an excessive force may be reduced or prevented from being applied to the first point P1 and the second point P2.

In particular, according to the example embodiment, the elastic portion 150 may reduce or prevent an excessive force from being applied to the elastic portion 150 or the bushing portion 140 by being in point contact with the rotating shaft 120 or the bushing portion 140. In this case, the elastic portion 150 may reduce or prevent an excessive frictional force from being generated when the rotating shaft 120 rotates.

According to the example embodiment, an insertion groove 121 into which the elastic portion 150 is inserted may be formed in at least one of the housing 110 and the bushing portion 140. In this case, the insertion groove 121 may reduce or prevent separation of the elastic portion 150. Also, when the elastic portion 150 may be formed to have a partially opened shape, instead of a closed ring shape, the elastic portion may be more easily provided on the rotating shaft 120 by being partially deformed.

Accordingly, the inlet guide vane assembly 100 may reduce or minimize noise and vibration occurring when the rotating shaft 120 rotates. Also, the inlet guide vane assembly 100 may reduce or prevent damage to at least one of the housing 110, the bushing portion 140, and the rotating shaft 120 by reducing or removing the imbalance of a force generated when the rotating shaft 120 rotates. Further the inlet guide vane assembly 100 may increase the lifetime of the inlet guide vane assembly device.

Figure 4:
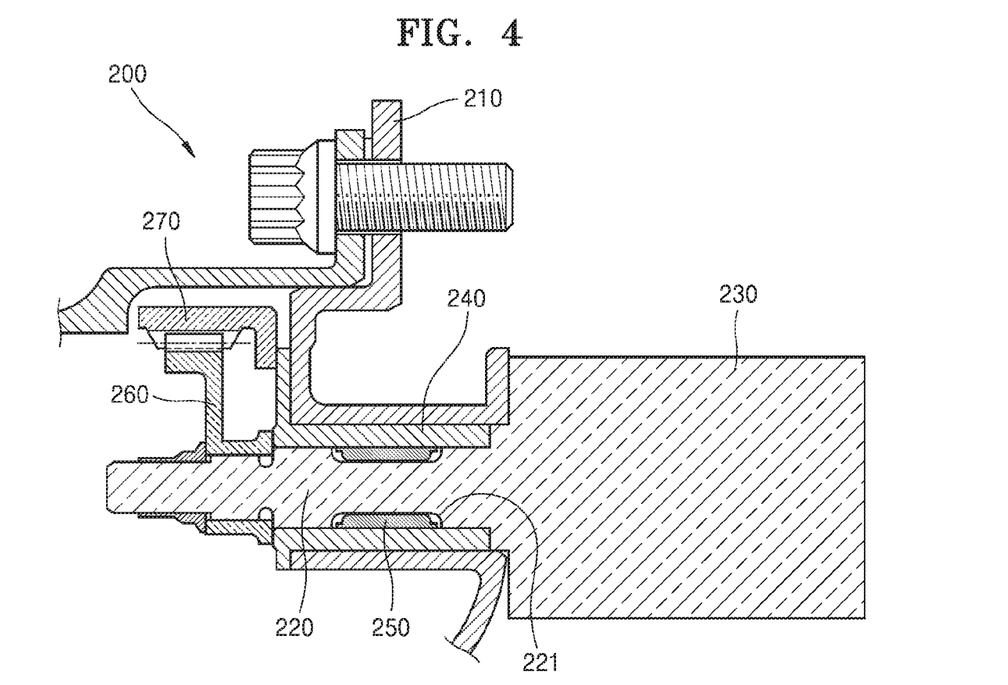
FIG. 4 is a cross-sectional view illustrating a part of an inlet guide vane assembly according to an example embodiment.
Figure 5:
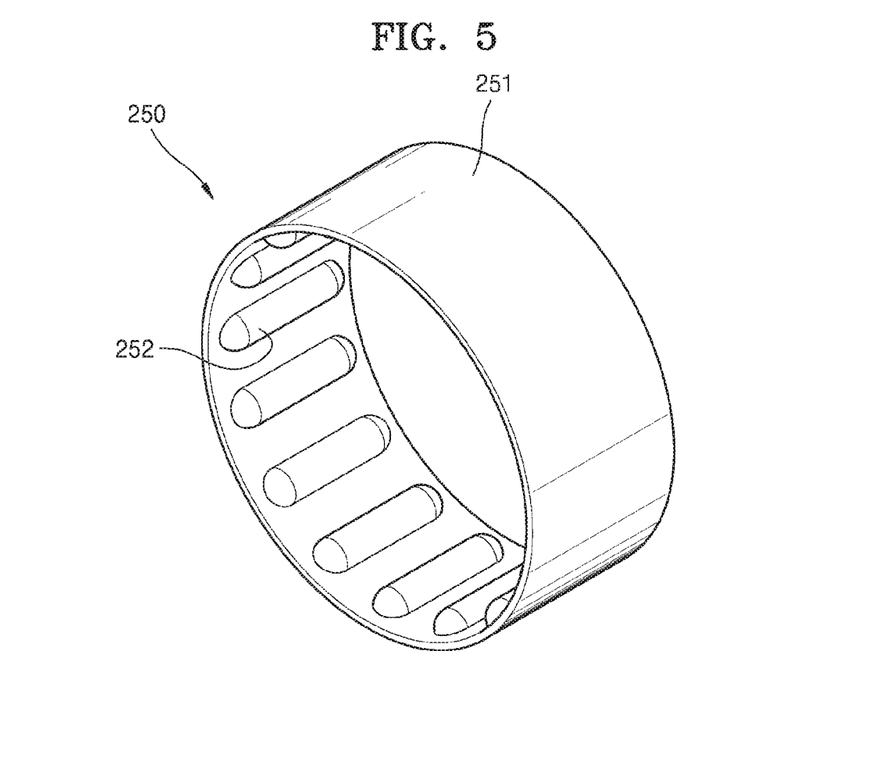
FIG. 5 is a perspective view illustrating an elastic portion of FIG. 4.

FIG. 4 is a cross-sectional view illustrating a part of an inlet guide vane assembly 200 according to an example embodiment. FIG. 5 is a perspective view illustrating an elastic portion 250 of FIG. 4.

Referring to FIGS. 4 and 5, the inlet guide vane assembly 200 may include a housing 210, a rotating shaft 220, a vane portion 230, a bushing portion 240, the elastic portion 250, a first gear 260, and a second gear 270. In this case, the housing 210, the rotating shaft 220, the vane portion 230, the bushing portion 240, the first gear 260, and the second gear 270 are the same as or similar to those described above, and thus a detailed explanation thereof will not be given.

The elastic portion 250 may include a body portion 251 and a protruding portion 252. In this case, the body portion 251 may be formed to have an annular shape. Also, the protruding portion 252 may protrude from the body portion 251 toward the rotating shaft 220 or the bushing portion 240. For convenience of explanation, the following will be described according to an example embodiment including the protruding portion 252 protruding from the body portion 251 toward the rotating shaft 220.

The protruding portion 252 may be in point contact or line contact with the rotating shaft 220. In this case, an insertion groove 221 into which the body portion 251 and the protruding portion 252 are inserted may be formed in at least one of the rotating shaft 220 and the bushing portion 240. According to an example embodiment, the insertion groove 221 may be formed in the rotating shaft 220. In this case, the insertion groove 221 may be formed along an outer circumferential surface of the rotating shaft 220. In an example embodiment, the insertion groove 221 may be formed so that a portion of the insertion groove 221 corresponding to the protruding portion 252 and the body portion 251 and a portion of the insertion groove 221 corresponding to only the body portion 251 have different depths.

An operation of the inlet guide vane assembly 200, according to an example embodiment as illustrated in FIG. 4, will now be described. When an external operating force is applied, the second gear 270 may rotate, and the first gear 260 may rotate as the second gear 270 rotates. In this case, the rotating shaft 220 may rotate along with the first gear 260, and the vane portion 230 may rotate along with the rotating shaft 220 to close an inner space of the housing 210.

When teeth of the first gear 260 and teeth of the second gear 270 contact each other and rotate, the rotating shaft 220 may rotate. In this case, the elastic portion 250 may reduce or minimize the movement of the rotating shaft 220 by providing an elastic force to the rotating shaft 220. Also, the elastic portion 250 may absorb vibration or a force generated in the rotating shaft 220.

Accordingly, the inlet guide vane assembly 200 may reduce or minimize noise and vibration occurring when the rotating shaft 220 rotates. Also, the inlet guide vane assembly 200 may reduce or prevent damage to at least one of the housing 210, the bushing portion 240, and the rotating shaft 220 by reducing or removing the imbalance of a force generated when the rotating shaft 220 rotates. The inlet guide vane assembly 200 may increase the lifetime of the inlet guide vane assembly device.

Figure 6:
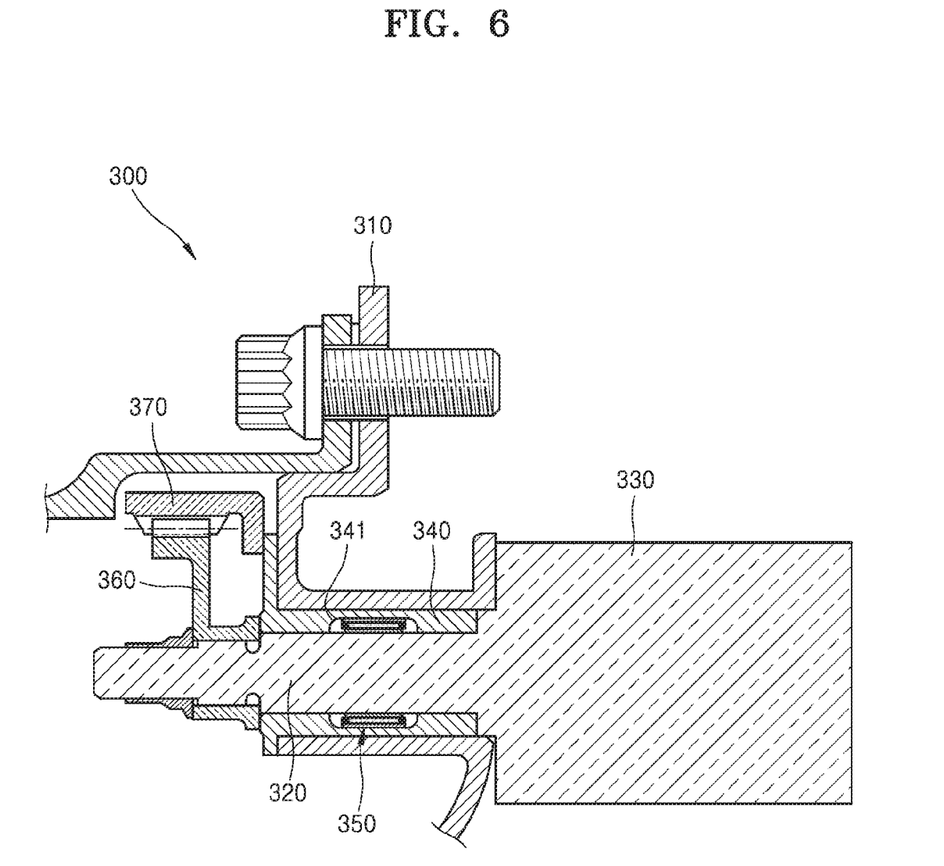
FIG. 6 is a cross-sectional view illustrating a part of an inlet guide vane assembly according to an example embodiment.
Figure 7:
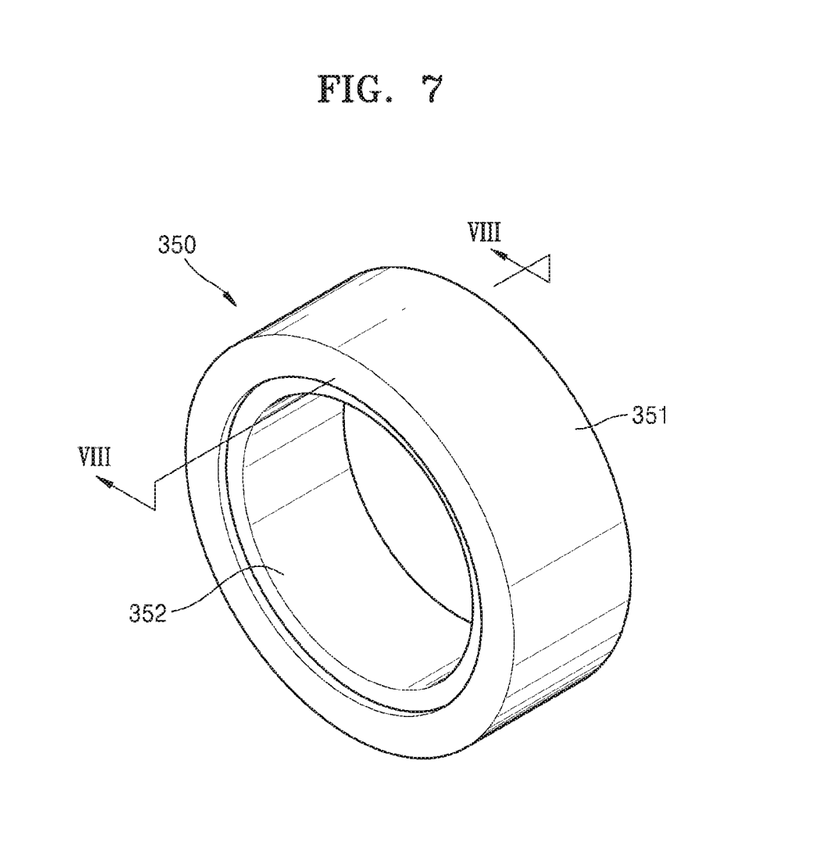
FIG. 7 is a perspective view illustrating an elastic portion of FIG. 6.
Figure 8:
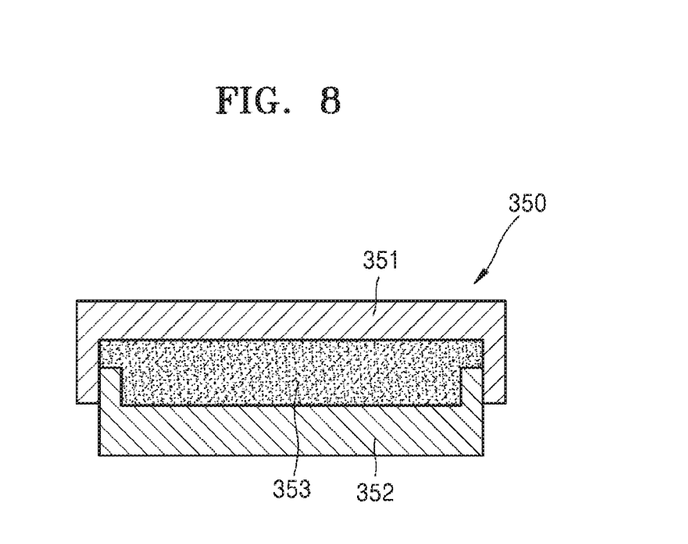
FIG. 8 is a cross-sectional view taken along a line VIII-VIII of FIG. 7.

FIG. 6 is a cross-sectional view illustrating an inlet guide vane assembly 300 according to an example embodiment. FIG. 7 is a perspective view illustrating an elastic portion 350 of FIG. 6. FIG. 8 is a cross-sectional view taken along a line VIII-VIII of FIG. 7.

Referring to FIGS. 6 through 8, the inlet guide vane assembly 300 may include a housing 310, a rotating shaft 320, a vane portion 330, a bushing portion 340, the elastic portion 350, a first gear 360, and a second gear 370. In this case, the housing 310, the rotating shaft 320, the vane portion 330, the bushing portion 340, the first gear 360, and the second gear 370 are the same as or similar to those described above, and thus a detailed explanation thereof will not be given.

The elastic portion 350 may be formed to have a ring shape. In this case, the elastic portion 350 may have an O-ring shape. However, example embodiments are not limited thereto, and the elastic portion 350 may have a ring damper shape. For convenience of explanation, the following will be described according to an example embodiment including the elastic portion 350 having a ring damper shape.

As illustrated in FIGS. 7 and 8, the elastic portion 350 may include a first case 351 and a second case 352 that are coupled to each other, and a damping fluid 353 located in the first case 351 and the second case 352. In this case, the first case 351 and the second case 352 may move relative to each other. Also, the elastic portion 350 may further include an additional sealing member located between the first case 351 and the second case 352.

The elastic portion 350 may be inserted into an insertion groove 341 that is formed in at least one of the rotating shaft 320 and the bushing portion 340. For convenience of explanation, the following will be described according to an example embodiment including the insertion groove 341 being formed in the bushing portion 340.

When the elastic portion 350 is inserted into the insertion groove 341, a part of the rotating shaft 320 may contact the bushing portion 340. Also, another part of the rotating shaft 320 may contact the elastic portion 350. In this case, the elastic portion 350 may be in a state where the elastic portion 350 provides an elastic force to the rotating shaft 320. Also, the elastic portion 350 may be in a state where the elastic portion 350 is fixed to the insertion groove 341.

In the inlet guide vane assembly 300, when the second gear 370 rotates due to an external driving force, the first gear 360 may rotate. In this case, the rotating shaft 320 may rotate along with the first gear 360, and the vane portion 330 may rotate along with the rotating shaft 320. In particular, the rotating shaft 320 may rotate, and the bushing portion 340 and the elastic portion 350 may be fixed.

In this case, when the rotating shaft 320 rotates, the elastic portion 350 may reduce a force applied to the rotating shaft 320 or may reduce a force applied by the rotating shaft 320 to the bushing portion 340 and the housing 310 by providing an elastic force to the rotating shaft 320.

Accordingly, the inlet guide vane assembly 300 may reduce or minimize noise and vibration occurring when the rotating shaft 320 rotates. Also, the inlet guide vane assembly 300 may reduce or prevent damage to at least one of the housing 310, the bushing portion 340, and the rotating shaft 320 by reducing or removing the imbalance of a force generated when the rotating shaft 320 rotates. The inlet guide vane assembly 300 may increase the lifetime of the inlet guide vane assembly device.

The one or more example embodiments may reduce or minimize the abrasion of a rotating shaft when a vane portion rotates. Also, the example embodiments may improve the lifetime and stability of an entire system by absorbing an external force applied to the rotating shaft when the vane portion operates.

While one or more example embodiments have been described with reference to the figures, it will be understood by one of ordinary skill in the art that various changes in form and details may be made therein without departing from the spirit and scope of the disclosure as defined by the following claims.

What is claimed is:

1. An inlet guide vane assembly comprising:
   a housing;
   a rotating shaft disposed in the housing;
   a vane portion connected to the rotating shaft;
   a bushing portion disposed between the rotating shaft and the housing; and
   an elastic portion disposed between the bushing portion and the rotating shaft,
   wherein the elastic portion comprises:
      a body portion; and
      a protruding portion protruding from the body portion,
   wherein an insertion groove into which the elastic portion is inserted is formed on an outer surface of the rotating shaft, and
   wherein a portion of the insertion groove corresponding to the protruding portion and the body portion, and a portion of the insertion groove corresponding to only the body portion have different depths.

2. The inlet guide vane assembly of claim 1, wherein the protruding portion protrudes from an inner surface of the body portion toward the rotating shaft.

3. The inlet guide vane assembly of claim 2, wherein the body portion is formed in an annular shape, and the protruding portion comprises a plurality of protruding portions space apart from each other.

4. The inlet guide vane assembly of claim 1, wherein the protruding portion and the rotating shaft are in line contact with each other.

5. The inlet guide vane assembly of claim 1, wherein a surface of the protruding portion contacting the rotating shaft is curved.

6. An inlet guide vane assembly comprising:
   a housing;
   a rotating shaft disposed in the housing;
   a vane portion connected to the rotating shaft;
   a bushing portion disposed between the rotating shaft and the housing; and
   an elastic portion disposed between the bushing portion and the rotating shaft,
   wherein the elastic portion comprises:
      a first case; and
      a second case coupled to the first case and configured to move corresponding to the first case,
   wherein the elastic portion further comprises a damping fluid between the first case and the second case.

7. The inlet guide vane assembly of claim 6, wherein an insertion groove into which the elastic portion is inserted is formed on an outer surface of the rotating shaft.

8. The inlet guide vane assembly of claim 6, further comprising:
   a first gear disposed on the rotating shaft and configured to rotate the rotating shaft; and
   a second gear connected to the first gear and configured to rotate the first gear.

* * * * *